US006407788B1

United States Patent
Okumura et al.

(10) Patent No.: US 6,407,788 B1
(45) Date of Patent: Jun. 18, 2002

(54) SURFACE PROTECTION FILM FOR LIQUID CRYSTAL DISPLAY, LIQUID CRYSTAL DISPLAY PROTECTED WITH THE SURFACE PROTECTION FILM AND METHOD OF PROTECTING LIQUID CRYSTAL DISPLAY WITH THE SURFACE PROTECTION FILM

(75) Inventors: Kazuhito Okumura; Hidehiko Andou, both of Ibaraki (JP)

(73) Assignee: Nitto Denko Corporation, Ibaraki (JP)

( * ) Notice: Subject to any disclaimer, the term of this patent is extended or adjusted under 35 U.S.C. 154(b) by 75 days.

(21) Appl. No.: 09/709,888

(22) Filed: Nov. 10, 2000

(30) Foreign Application Priority Data

Nov. 18, 1999 (JP) ............................................ 11-328545
Sep. 5, 2000 (JP) ....................................... 2000-268693

(51) Int. Cl.[7] ......................................... G02F 1/1335
(52) U.S. Cl. ..................................................... 349/122
(58) Field of Search ......................................... 349/122

(56) References Cited

U.S. PATENT DOCUMENTS

| | | | | |
|---|---|---|---|---|
| 4,647,157 A | * | 3/1987 | Chiklis ........................ | 350/343 |
| 5,721,601 A | * | 2/1998 | Yamaji et al. ............... | 349/138 |
| 6,174,405 B1 | * | 1/2001 | Clarke ......................... | 156/289 |
| 6,296,930 B1 | * | 10/2001 | Ohbe et al. ............... | 428/304.4 |

FOREIGN PATENT DOCUMENTS

| | | | | |
|---|---|---|---|---|
| JP | 9-43584 | * | 2/1997 | ................. 349/122 |
| JP | 11-327448 | * | 11/1999 | ................. 349/122 |

OTHER PUBLICATIONS

Rinjiro et al., "Surface Protective Film for Liquid Crystal Display Panel," MicroPatent Worldwide PatSearch, MicroPatent Reference No. 001460390 (JP 04030120) (Feb. 3, 1992) Abstract only.

Mamoru et al., "Electrically Conductive, Transparent Film for Protection Purposes," MicroPatent Worldwide PatSearch, MicroPatent Reference No. 001733219 (JP 05331431) (Dec. 14, 1993) Abstract only.

Mamoru et al., "Conductive Transparent Protective Film," MicroPatent Worldwide PatSearch, MicroPatent Reference No. 000784391 (JP 09207259) (Aug. 12, 1997) Abstract only.

Masaaki et al., "Polarizing Plate, Phase–Difference Plate and Elliptical Polarizing Plate," MicroPatent Worldwide PatSearch, MicroPatent Reference No. 002004045 (JP 06051122) (Feb. 25, 1994) Abstract only.

Toshiaki et al., "Protective Film for Polarizing Plate," MicroPatent Worldwide PatSearch, MicroPatent Reference No. 002070638 (JP 06123806) (May 6, 1994) Abstract only.

Norinaga et al., "Highly Transparent and Slightly Sticky Antistatic Protective Film," MicroPatent Worldwide PatSearch, MicroPatent Reference No. 002584588 (JP 07026223) (Jan. 27, 1995) Abstract only.

(List continued on next page.)

Primary Examiner—James Dudek
(74) Attorney, Agent, or Firm—Leydig, Voit & Mayer, Ltd.

(57) ABSTRACT

A film for protecting a display surface of a liquid crystal display is provided, which contains a polymer film having a coefficient of bending stress k as expressed by the formula: $k=Eh^3$, wherein E is a tensile elastic modulus ($N/mm^2$) in a machine direction and h is a thickness (mm), of not less than 0.01 (N·mm), and which shows an amount of moisture permeation at 35° C., 80% RH (relative humidity) for 72 hours of not less than 100 $g/m^2$·72 hr. According to the present invention, the protection film can be applied to the display surface of a liquid crystal module with superior workability during assembling. The film prevents occurrence of changes in optical hue (color shading) on the display surface in the state of actual use upon peeling off of the protection film after distribution process.

16 Claims, 1 Drawing Sheet

OTHER PUBLICATIONS

Haruhira et al., "Adhesive Sheet," MicroPatent Worldwide PatSearch, MicroPatent Reference No. 000963458 (JP 09033723) (Feb. 7, 1997) Abstract only.

Haruhira et al., "Self–Adhesive Sheet," MicroPatent Worldwide PatSearch, MicroPatent Reference No. 000956524 (JP 09087593) (Mar. 31, 1997) Abstract only.

Kazuo et al., "Surface Protective Film for Polarizing Plate or Phase Plate," MicroPatent World PatSearch, MicroPatent Reference No. 000880070 (JP 09113726) (May 2, 1997) Abstract only.

Toru et al., "Protective Film for Polarizing Plate and Polarizing Plate," MicroPatent Worldwide PatSearch, MicroPatent Reference No. 000781149 (JP 09203810) (Aug. 5, 1997) Abstract only.

Koji et al., "Pressure–Sensitive Adhesive and Surface–Protecting Film Formed by Coating the Same," MicroPatent Worldwide PatSearch, MicroPatent Reference No. 000785945 (JP 09208910) (Aug. 12, 1997) Abstract only.

Masashi et al., "Surface Protective Film for Liquid Crystal Display Panel," MicroPatent Worldwide PatSearch, MicroPatent Reference No. 000411980 (JP 11070629) (Mar. 16, 1999) Abstract only.

Naoyasu et al., "Antistatic Plate," MicroPatent Worldwide PatSearch, MicroPatent Reference No. 000432415 (JP 11091038) (Apr. 6, 1999) Abstract only.

Hidekazu et al., "Protective Film for Resin Sheet of Liquard Crystal Display," MicroPatent Worldwide Patsearch, MicroPatent Reference No. 000522713 (JP 11181370) (Jul. 6, 1999) Abstract only.

Sachiro, "Surface–Protective Film," MicroPatent Worldwide PatSearch, MicroPatent Reference No. 000597434 (JP 11256115) (Sep. 21, 1999) Abstr. only.

Sachiro, "Surface–Proctective Film," MicroPatent Worldwide PatSearch, MicroPatent Reference No. 000597435 (JP 11256116) (Sep. 21, 1999) Abstract only.

Hiroyuki et al., "Surface Protection Film and Method for Sticking Same," MicroPatent Worldwide PatSearch, MicroPatent Reference No. 001435439 (JP 2000094565) (Apr. 4, 2000) Abstract only.

Masashi et al., "Liquid Crystal Display Panel Surface Protective Film," MicroPatent Worldwide PatSearch, MicroPatent Reference No. 001508813 (JP 2000168015) (Jun. 20, 2000) Abstract only.

Masashi et al., "Liquid Crystal Display Surface Protective Film," MicroPatent Worldwide PatSearch, MicroPatent Reference No. 001508814 (JP 2000168016) (Jun. 20, 2000) Abstract only.

Noriki et al., "Film Used in Liquid Crystal Display Member," Patent Abstracts only of Japan (JP 2000–212298) (Feb. 8, 2000).

* cited by examiner

FIG. 1

SURFACE PROTECTION FILM FOR LIQUID CRYSTAL DISPLAY, LIQUID CRYSTAL DISPLAY PROTECTED WITH THE SURFACE PROTECTION FILM AND METHOD OF PROTECTING LIQUID CRYSTAL DISPLAY WITH THE SURFACE PROTECTION FILM

TECHNICAL FIELD OF THE INVENTION

The present invention relates to a surface protection film for a liquid crystal display to be used for personal computers, word processors, TV and the like, a liquid crystal display protected with the surface protection film and a method for protecting the surface of a liquid crystal display with the surface protection film.

BACKGROUND OF THE INVENTION

Liquid crystal displays are produced by laminating various optical elements such as a glass substrate, a liquid crystal, a polarizing plate (film), a phase plate (film), an anti-reflection film and the like, fixing the outer periphery with a fixing frame made of a metal plate of stainless and the like, which is called "bezel", to give a liquid crystal module, assembling this liquid crystal module in a case together with other constituent members and housing the resulting structure. The display part of a liquid crystal display is generally covered with a surface protection film (sheet) in order to prevent adhesion of and contamination with dust and the like during the assembly step and distribution process of the products (merchandise). This is performed by applying the sheet onto the display surface of a liquid crystal module during the production of the module. Since the display part of a liquid crystal display, which is a final product, consists of a display part of a liquid crystal module, the surface of the display part of the module is covered with a surface protection film (sheet) during the production of the module.

The display surface is covered by adhering a surface protection adhesive sheet (laminate film) having a releasable adhesive layer formed on the entire area of one side surface of a film, such as a polyethylene film, a polypropylene film, a vinyl chloride film, a polyethylene terephthalate film and the like, to the display surface of a liquid crystal module, or by superimposing the above-mentioned polyethylene film, polypropylene film, vinyl chloride film, polyethylene terephthalate film and the like on the display surface of a liquid crystal module and fixing the outer periphery of the film with an adhesive tape, or by other method.

When the display surface of a liquid crystal module is covered with a protection film during the assembly of a liquid crystal display, however, changes in optical hue (color shading) are sometimes observed on the display surface when the protection film is peeled off, after distribution process, for actual use of the liquid crystal display, which degrades the reliability as a display unit.

SUMMARY OF THE INVENTION

In view of the above situation, the present invention aims at providing a surface protection film for a liquid crystal display, which is capable of suppressing changes in the optical hue (color shading) on the display surface of a liquid crystal display (display surface of a liquid crystal module), a liquid crystal display protected with the surface protection film, and a method for protecting the surface of a liquid crystal display with the surface protection film.

According to the present invention, the mechanism of changes in the optical hue (color shading), that are caused by the covering of the display surface of a liquid crystal module with a protection film, has been investigated and the following (i) to (iii) have been found.

(i) The changes in the optical hue (color shading) occur due to difference in the color between an area of the surface of a polarizing plate constituting the display surface of a liquid crystal module, where the protection film is not adhered closely (e.g., vicinity of bezel having uneven surfaces), and an area where the film is adhered closely, the former looking reddish.

(ii) The polarizing plate looks reddish because the polarizing plate absorbs moisture, which varies light transmittance.

(iii) The reddish color is produced by the greater absorption of moisture than in the area where the protection film is adhered closely.

The present invention is based on the finding that the use of a film, which shows moisture permeation above a certain amount under a specific environment, as a surface protection film can obliterate the occurrence of color shading on the display surface of a liquid crystal display. The present invention is characterized by the following features.

(1) A film for protecting a display surface of a liquid crystal display, which comprises a polymer film having a coefficient of bending stress k as expressed by the formula: $k=Eh^3$, wherein E is a tensile elastic modulus ($N/mm^2$) in the MD (machine direction) and h is a thickness (mm), of not less than 0.01 (N·mm), and which shows an amount of moisture permeation at 35° C., 80% RH (relative humidity) for 72 hours of not less than 100 $g/m^2 \cdot 72$ hr.

(2) A film for protecting a display surface of a liquid crystal display, which comprises a laminate film comprising a polymer film having a coefficient of bending stress k as expressed by the formula: $k=Eh^3$, wherein E is a tensile elastic modulus ($N/mm^2$) in the MD (machine direction) and h is a thickness (mm), of not less than 0.01 (N mm), and an adhesive layer formed on one side of the polymer film, or a laminate film comprising the above polymer film, an adhesive layer formed on one side of the polymer film, and a back coating layer formed on the other side of the polymer film, and which has an amount of moisture permeation at 35° C., 80% RH for 72 hours of not less than 100 $g/m^2 \cdot 72$ hr.

(3) The protection film of (1) above, wherein the polymer film has been subjected to an antistatic treatment comprising adding an antistatic agent.

(4) The protection film of (2) above, wherein the laminate film has been subjected to an antistatic treatment comprising adding an antistatic agent to the adhesive layer and/or the polymer film, or forming an antistatic layer under the adhesive layer and/or the back coating layer.

(5) The protection film of (1) or (2) above, wherein the polymer film is selected from the group consisting of a cellulose film, a poly(vinyl alcohol) film, a nylon film, a polystyrene film and a poly(meth)acrylonitrile film.

(6) The protection film of (1) or (2) above, wherein the polymer film has a thickness of not less than 15 μm.

(7) The protection film of (1) or (2) above, which makes a difference ($\Delta a^*$) in a perception chromaticity index $a^*$, as measured by a CIE1976 $L^*a^*b^*$ colorimetric system, between a partial display surface covered with the film and the display surface without the film, not more than 0.2, wherein the difference is obtained by covering a part of the display surface of a polarizing plate with the protection film, standing the polarizing plate at 35° C., 80% RH for 72 hours, and determining the indices of the covered part and the uncovered part.

(8) A liquid crystal display comprising a display surface protected with the protection film of (1) or (2) above.

(9) A method for protecting a surface of a liquid crystal display, which comprises covering the display surface with the protection film of (1) or (2) above.

(10) A film for protecting a display surface of a liquid crystal display, which comprises a polymer film having a coefficient of bending stress k as expressed by the formula: $k=Eh^3$, wherein E is a tensile elastic modulus (N/mm$^2$) in the MD (machine direction) and h is a thickness (mm), of not less than 0.01 (N·mm), and which shows an amount of moisture permeation at 35° C., 80% RH for 72 hours of not less than 100 g/m$^2$·72 hr and not more than 7000 g/m$^2$·72 hr.

(11) A film for protecting a display surface of a liquid crystal display, which comprises a laminate film comprising a polymer film having a coefficient of bending stress k as expressed by the formula: $k=Eh^3$, wherein E is a tensile elastic modulus (N/mm$^2$) in the MD (machine direction) and h is a thickness (mm), of not less than 0.01 (N·mm), and an adhesive layer formed on one side of the polymer film, or a laminate film comprising the above polymer film, an adhesive layer formed on one side of the polymer film, and a back coating layer formed on the other side of the polymer film, and which shows an amount of moisture permeation at 35° C., 80% RH for 72 hours of not less than 100 g/m$^2$·72 hr and not more than 7000 g/m$^2$·72 hr.

DETAILED DESCRIPTION OF THE INVENTION

The surface protection film for liquid crystal display of the present invention (hereinafter to be also referred to as a protection film of the present invention) is primarily characterized by the amount of moisture permeation. at 35° C., 80% RH for 72 hours of not less than 100 g/m$^2$·72 hr.

The present invention is based on the finding that the color shading on the surface of a display part (display part of liquid crystal module), that occurs during the assembly and distribution process of the liquid crystal display, can be reproduced by covering the surface of a polarizing plate constituting the display surface of a liquid crystal module in such a manner that the film forms an adhesion part and non-adhesion part and standing the polarizing plate under the environment of 35° C., 80% RH for 72 hours; the color shading can be prevented by the use of a film that shows an amount of moisture permeation at 35° C., 80% RH for 72 hours of not less than 100 g/m$^2$·72 hr; and that, when this film is used as a surface protection film for a liquid crystal display, a display surface of the liquid crystal display does not suffer from color shading under the actual use environment,, even after assembly and distribution process of the product.

The amount of moisture permeation of the above-mentioned film under the environment of 35° C., 80% RH for 72 hours was measured as follows.

(i) The film was stood at temperature 23° C., humidity 65% RH for 6 hours.

(ii) The film was set on a moisture permeation dish as defined in JIS Z 0208 (dish method) (moisture permeation area 28.27 cm$^2$, ring inner diameter (φ) of moisture permeation dish 60 mm) to give a test sample. The moisture absorbent and sealing wax used then were those defined in JIS Z 0208 (dish method).

(iii) The test sample was weighed by an analytical balance, and the measure was taken as the initial weight ($W_0$) of the test sample.

(iv) The test sample was placed in a thermohygrostat set to temperature 35° C., relative humidity 80%, and taken out 72 hours later to allow equilibration with room temperature. The test sample was weighed by an analytical balance, and the measure was taken as the 72 hr after weight (W) of the test sample. The amount of moisture permeation [g/m$^2$·72 hr] was determined according to the following formula:

$$\text{Amount of moisture permeation [g/m}^2\cdot72\text{ hr]}=(W-W_0)/(3\times3\times\pi\times10^{-4})$$

When the moisture absorbent in the dish was capable of moisture absorption by more than 10% of the weight of the absorbent during standing of the test sample in the thermohygrostat, the test was stopped before it showed the 10% moisture absorption. In this case, the amount of moisture permeation was calculated based on the time spent for the test. The amount of moisture permeation after 72 hours was obtained by converting the obtained amount of moisture permeation to that after 72 hours by proportional calculation.

The protection film of the present invention does not encompass a film having a large hole that would inhibit protection (prevention of dust, stain and the like from adhering to the display surface) of the display surface of a liquid crystal module and a film showing inconsistent moisture permeability over the entirety of the film due to a sea-island type mixed presence of the area having high moisture permeability and the area having low moisture permeability, even if the films show an amount of moisture permeation of not less than 100 g/m$^2$·72 hr as measured by the above-mentioned method.

The protection film of the present invention is applied in a conventional manner in which (a) the film is laid on the display surface of a liquid crystal module and the outer periphery of the film is fixed with an adhesive tape, or (b) an adhesive layer is formed on one side of the film and the adhesive layer is adhered to a display surface to cover the display surface. The films used in the mode of (a) in most cases consist of a polymer film alone and the films used in the mode of (b) are mostly laminate films having an adhesive layer formed on one side of the polymer film, or laminate films having an adhesive layer formed on one side of the polymer film and a back coating layer on the other side. The protection film of the present invention preferably undergoes an antistatic treatment, like other films for different uses.

With regard to the protection film of the present invention, by the "amount of moisture permeation at 35° C., 80% RH (relative humidity) for 72 hours of not less than 100 g/m$^2$·72 hr" is meant, when the protection film is made from a polymer film itself with or without an antistatic treatment, that the amount of moisture permeation measured at 35° C., 80% RH after a period of 72 hours is not less than 100 g/m$^2$·72 hr. When the protection film is a laminate comprising a polymer film and an adhesive layer, or a polymer film, an adhesive layer and a back coating layer, the laminate film with or without an antistatic treatment shows an amount of moisture permeation at 35° C., 80% RH for 72 hours of not less than 100 g/m$^2$·72 hr.

The protection film of the present invention should have not only the above-mentioned specific amount of moisture permeation, but also mechanical strength (e.g., strength of the level that does not affect the workability during coating of the display surface of a liquid crystal module) practically required as a film that protects the display surface of a liquid crystal module. For this end, the protection film of the present invention is secondarily characterized by the coefficient of bending stress k as expressed by the formula: k=Eh$^3$ wherein E is a tensile elastic modulus (N/mm$^2$) in the MD (machine direction) and h is a thickness (mm), of not less than 0.01 (N·mm).

That is, when the polymer film has a coefficient of bending stress k of less than 0.01 (N·mm), the protection film may become wrinkled when covering the display surface of a liquid crystal module, making handling difficult and covering without wrinkles unattainable. In particular, the coefficient of bending stress k of the polymer film is preferably not less than 0.012 (N·mm), more preferably not less than 0.03 (N·mm). As used herein, the tensile elastic modulus in MD of the polymer film is measured according to ASTM D-822.

The polymer film constituting the protection film of the present invention is exemplified by cellulose acetate films such as triacetylcellulose film, cellulose diacetate film and the like; cellulose films such as cellophane film, ethylcellulose film, cellulose acetate butyrate film, cellulose nitrate film, benzylcellulose film and the like; poly(vinyl alcohol) film; nylon films such as nylon 6 film, nylon 610 film and the like; polystyrene film; polymethacrylate films such as poly (methyl methacrylate) film, poly(ethyl methacrylate) film, poly(butyl methacrylate) film and the like; polyphenylene oxide film; polycarbonate film; polyoxymethylene film; polyimide film; poly(vinyl acetate) film; poly(meth) acrylonitrile films such as acrylonitrile-styrene copolymer film, methacrylonitrile-styrene copolymer film, acrylonitrile-acrylate ester-butadiene copolymer film, polymethacrylonitrile film, polyacrylonitrile film and the like; phenolic resin films such as bakelite; and the like. In particular, cellulose film, poly(vinyl alcohol) film, nylon film, polystyrene film and poly(meth)acrylonitrile film are preferable. These polymer films are known and used in other fields, but have not been used as a protection film for the display surface of a liquid crystal display. The polyethylene film, polypropylene film, vinyl chloride film, polyethylene terephthalate film and the like, which are conventional protection films for a display surface, when having the least possible thickness to provide the strength sufficient to allow application of the film to a display surface, show an amount of moisture permeation as measured by the above-mentioned method of less than 100 g/m$^2$·72 hr.

Any polymer film other than the polymer films exemplified above can be used as the protection film of the present invention, as long as it has a mechanical strength practically necessary as a protection film of the display surface of a liquid crystal display [i.e., coefficient of bending stress k of the film of not less than 0.01 (N·mm)] and shows, upon preparation into a desired protection film (a polymer film or a laminate film), an amount of moisture permeation as measured by the above-mentioned method of not less than 100 g/m$^2$·72 hr. Examples of such polymer film include a polymer film having a hydrophilic group (polar group) such as hydroxyl group, carboxyl group, ester bond, ether bond, nitrogen atom, like the above-mentioned polymer films, and a polymer film having a spatially large side chain (e.g., aromatic group such as phenyl group and the like).

According to the protection film of the present invention, the polymer film is not limited in terms of form. A typical film without substantial cavity (formed without a step associated with formation of cavity), a porous film (void-containing film) or a nonwoven fabric can be-used. When it is a porous film or a nonwoven fabric, however, it is preferable that the cavities (voids) be formed uniformly. When they exist non-uniformly, areas having high moisture permeability and low moisture permeability are mixed in a sea-island state, which causes inconsistent moisture permeability and reduced coefficient of bending stress of the film.

The polymer film of the protection film of the present invention has a thickness that is subject to variation depending on the material. In consideration of the workability (handling of the protection film) during application onto the display surface of a liquid crystal module, it is generally not less than 15 µm, preferably not less than 20 µm, more preferably 25–200 µm.

The protection film of the present invention shows an amount of moisture permeation as measured by the above-mentioned method of not less than 100 g/m$^2$·72 hr, preferably not less than 120 g/m$^2$·72 hr, particularly preferably 120–5000 g/m$^2$·72 hr. When the amount of moisture permeation is too high, the dimensional changes of the film due to the environmental humidity become substantial, which in turn shows propensity toward lower workability during coating of the display surface of a liquid crystal module. Therefore, a film showing an amount of moisture permeation above 7000 g/m$^2$·72 hr is not preferable.

In addition, the polymer film of the protection film of the present invention preferably shows a coefficient of water absorption as measured according to ASTM D570 of not more than 10%, more preferably 0–5%, most preferably 0–2%. When the coefficient of water absorption of the polymer film is within the above-mentioned preferable range, the polymer film suffers less from dimensional changes (less occurrence of curls and wrinkles), thus improving the dimensional stability of the protection film to afford better workability.

The antistatic treatment of the protection film of the present invention generally includes adding an antistatic agent to a polymer film and/or an adhesive layer, forming a priming layer (antistatic layer) on the polymer film before forming an adhesive layer and/or a back coating layer, or other steps.

The antistatic agent may be a material known as an antistatic agent for polymer materials, and the following are preferable.

Various surfactants such as cationic (e.g., quaternary ammonium salt type, phosphonium salt type, sulfonium salt type and the like), anionic (e.g., carboxylic acid type, sulfonate type, sulfate type, phosphate type, phosphite type and the like), amphoteric (e.g., sulfobetaine type, alkylbetaine type, alkylimidazolium betaine type and the like) or nonionic (e.g., polyhydric alcohol derivative, β-cyclodextrin clathrate compound, sorbitan fatty acid monoester-diester, poly(alkylene oxide) derivative, amine oxide and the like) surfactants which are added to a polymer film and/or an adhesive layer, or used for forming an antistatic layer;

a homopolymer of monomer having an ion conductive group of a cationic type (e.g., quaternary ammonium salt and the like), amphoteric type (e.g., betaine compound and the like), anionic (e.g., sulfonate salt and the like) or nonionic type (e.g., glycerin and the like), or a copolymer of the monomer and a different monomer, a polymer having ionic conductivity, such as a polymer having a moiety derived from acrylate or methacrylate having a quaternary ammonium base, and the like, all of which are used for forming an antistatic layer;

an antistatic paint containing a binder comprising a polymer made from polyester, urethane, acrylic, acrylic melamine and the like, which is used for forming an antistatic layer; a permanent antistatic agent which is an alloy of a hydrophilic polymer, such as poly(ethylene methacrylate) copolymer and the like, and an acrylic resin and the like, and which is used for adding to a polymer film and/or an adhesive layer; and a conductive filler, such as acetylene black, ketzen black, natural graphite, artificial graphite, titanium black, zinc oxide, tin oxide, tin coated titanium oxide, nickel flake, phosphorus doped tin oxide, antimony doped tin oxide and the like, which is added to a polymer film and/or an adhesive layer.

The above-mentioned antistatic paint generally contains a conductive filler. The conductive filler is basically the same as the conductive fillers mentioned above, which are added to a polymer film and/or an adhesive layer. Namely, acetylene black, ketzen black, natural graphite, artificial graphite and titanium black are used as conductive fillers for a black antistatic paint; zinc oxide, tin oxide and tin coated titanium oxide are used as conductive fillers for a white antistatic paint; nickel-flake is used as a conductive filler for a silver antistatic paint; and phosphorus doped tin oxide and antimony doped tin oxide are used as conductive fillers for a clear antistatic paint.

The antistatic agent is used in a small amount for forming an antistatic layer, for adding to a polymer film, or for adding to an adhesive layer. It is used in such an amount that does not greatly degrade the moisture permeability of the protection film. When an antistatic layer is formed, the amount (after drying) of the antistatic agent applied per 1 $m^2$ of a polymer film is generally 0.02–5 g, preferably 0.05–2 g. When the antistatic agent is added to a polymer film, its amount is generally 0.1–5 wt %, preferably 0.2–2 wt %, relative to the polymer film. When it is added to an adhesive layer, its amount is generally 0.1–5 wt %, preferably 0.2–2 wt %, of the adhesive.

When an adhesive layer is formed on a polymer film, the adhesive is generally applied in an amount of 2–30 g, preferably 5–20 g, per 1 $m^2$ of the polymer film, to afford necessary adhesive power. The amount of the adhesive to be applied is greater than the amount of the antistatic agent. The moisture permeability of the adhesive affects the moisture permeability of the protection film as a whole. Therefore, it is preferable that the adhesive show high moisture permeability. The kind and the application amount of the adhesive are appropriately determined to make the amount of moisture permeation for 72 hours of the protection film as a whole not less than 100 $g/m^{2 \cdot 72}$ hr. The adhesive is preferably made from a polymer wherein the main component (base polymer) contains relatively large amounts of oxygen and nitrogen in a molecule. For example, an acrylic adhesive and the like are used. The acrylic adhesive is preferably one obtained by crosslinking an acrylic polymer by the use of a crosslinking agent. Particularly preferable is one obtained by crosslinking using an epoxy type crosslinking agent.

Inasmuch as a rubber adhesive containing natural rubber or a synthetic rubber (e.g., polyisobutylene rubber etc.) as a main component (base polymer) does not contain elements of oxygen or nitrogen in the main component rubber molecules, or contains the elements only in small amounts, the moisture permeability becomes generally low. However, a rubber adhesive can be also used when a polymer film has a considerably high moisture permeability and when the polymer film having a rubber adhesive layer with or without a back coating layer does not show an amount of moisture permeation of less than 100 $g/m^{2 \cdot 72}$ hr.

The back coating agent (release agent) used as a back coating layer can be a known material used as a back coating agent (release agent) in the fields of adhesive tape, adhesive film and the like. Of these, an alkyl pendant type release agent and a silicone release agent are preferable, particularly preferably an alkyl pendant type release agent. Examples of preferable alkyl pendant type release agent include those mainly containing copolymer of long-chain alkyl acrylate, copolymer of long-chain alkyl vinyl ester, copolymer of long-chain alkyl vinyl ether, copolymer of long-chain alkyl acrylamide, copolymer of long-chain alkyl derivative of maleic acid, long-chain alkyl esterification product of hydrbxyl group-containing polymer, long-chain alkyl carbamate of hydroxyl group-containing polymer and the like. The long-chain alkyl here preferably has 18 to 30 carbon atoms. Examples of the silicone release agent include condensation type silicone release agent and addition type silicone release agent. The back coating agent (release agent) is used in a small amount, like the antistatic agent, and does not greatly degrade the moisture permeability of the protection film. The amount coated of the back coating agent per 1 $m^2$ of the polymer film (attached amount after drying) is generally 0.2–2 g, preferably 0.4–1 g.

According to the present invention, the presence or otherwise of occurrence of color shading on the display surface of a liquid crystal display (surface of polarizing plate) is visually judged. In addition, the color shading in the surface of a polarizing plate is expressed using objective figures obtained by the following method to improve accuracy and to generalize the evaluation.

That is, a protection film is adhered to a part of the surface of a polarizing plate constituting the display surface of a liquid crystal module, thereby to form a close adhesion part having the protection film, and the other part of the polarizing plate is left uncovered to give a non-close adhesion part without the protection film, whereby a sample for a color shading evaluation test is prepared. The sample is left standing at 35° C., 80% RH for 72 hours. The close adhesion part and the non-close adhesion part of the polarizing plate are measured for the light transmittance by a spectrophotometer. Using a CIE1976 L*a*b* colorimetric system, perception chromaticity index a* of the close adhesion part and the non-close adhesion part is determined. The occurrence of color shading is determined based on the difference in a*($\Delta a^*$) between the obtained measures of the close adhesion part and the non-close adhesion part. To be specific, when $\Delta a^*$ is not more than 0.2, the polarizing plate is considered to be free of color shading and when $\Delta a^*$ exceeds 0.2, the polarizing plate is considered to show color shading. When $\Delta a^*$ is not more than 0.2, the amount of moisture permeation of the protection film at 35cc, 80% RH for 72 hours is not less than 100 $g/m^2 \cdot 72$ hr. A liquid crystal display having the display surface of the liquid crystal module covered with a protection film that makes $\Delta a^*$ not more than 0.2 did not show color shading on the display surface upon peeling off of the protection film after distribution process. In contrast, when $\Delta a^*$ exceeded 0.2, the amount of moisture permeation of the protection film at 35° C., 80% RH for 72 hours was less than 100 $gm^{2 \cdot 72}$ hr. A liquid crystal display having the display surface of the liquid crystal module covered with a protection film that makes $\Delta a^*$ above 0.2 showed color shading on the display surface upon peeling off of the protection film after distribution process.

The present invention is explained in detail in the following by referring to illustrative Examples and Comparative Examples. The present invention is not limited by these examples.

EXAMPLES 1–9

COMPARATIVE EXAMPLES 1–3

Moisture-proof cellophane 1 [VMT (trademark), Futamura Chemical Industries, Co., Ltd.], moisture-proof cellophane 2 [G-1 (trademark), Futamura Chemical Industries, Co., Ltd.], moisture-proof cellophane 3 [G-3 (trademark), Futamura Chemical Industries, Co., Ltd.], triacetylcellulose film [SH-TAC (trademark), FUJI PHOTO FILM CO., LTD], PVA (poly(vinyl alcohol)) film [Vinylon (trademark), KURARAY CO., LTD.], nylon 6 film [Rayfan 1401 (trademark), Toray Plastic film Co., Ltd.], nylon 610 film [prepared from nylon 610 resin [CM2021 (trademark), Toray Industries, Inc.], with T die], polyacrylonitrile film [ZEXLON (trademark), Mitsui Chemicals], polystyrene film [Cellomer S-2 (trademark), Okura Industry Co., Ltd.], PET (polyethylene terephthalate) film [Lumirror S10 (trademark), Toray Industries, Inc.], and polyethylene film [prepared from polyethylene resin [MIRASON 12] (trademark), Mitsui Chemicals, by inflation technique] were prepared. The amount of moisture permeation at 35° C., 80% RH for 72 hours of each film was measured by the aforementioned method. Each film was subjected to the following test for the resistance to occurrence of color shading in the polarizing plate surface. In addition, the tensile elastic modulus and coefficient of bending stress of each film were measured. The results are shown in Table 1 below.

Figure 1:
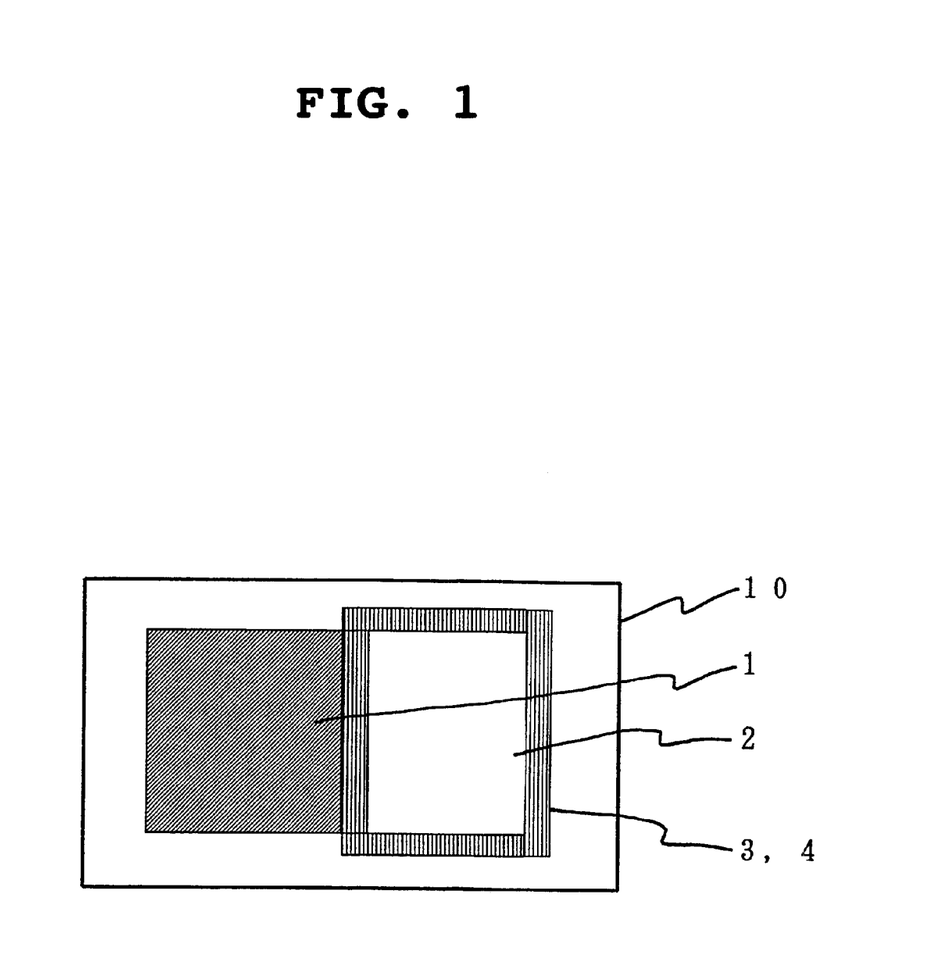
FIG. 1 shows a plane view of the test sample used for evaluation of color shading.

1. As shown in FIG. 1, a polarizing plate 1 (NPF HEG1425DUAGS1, Nitto Denko Corporation) upon adhesive processing was adhered to a glass plate 10, and a film 2 was placed on the polarizing plate 1 to cover approximately half the area of the plate. The outer periphery of the film was fixed with a tape 3 (No. 31B, Nitto Denko Corporation) to prevent invasion of moisture from the outer periphery. A protection tape 4 (SPM-364M, Nitto Denko Corporation) was adhered to this tape to prevent invasion of moisture from the outer periphery, whereby a color shading evaluation sample was prepared. The sample was placed in a thermohygrostat set to 35° C., 80% RH, left standing therein for 72 hours and taken out.

2. The tapes 3 and 4 were peeled off and the film 2 was removed. The obtained sample was placed on a white paper to visually determine the difference in hue between the part without the film (free part) and the part with the film.

3. A tape (substrate thickness 80 μm, adhesive thickness 25 μm) obtained by applying an acrylic adhesive to a triacetate substrate was adhered to the surface of the polarizing plate (upon anti-glare processing) of the above-mentioned sample, and the polarizing plate 1 was removed from the glass plate 10. The adhesive on the removed polarizing plate was removed by picking the adhesive on the plate with an adhesive side of the cellophane tape. The surface, from which the adhesive had been removed, was wiped gently with hexane. The polarizing plate sample thus prepared was subjected to the measurement of light transmittance by a spectrophotometer with regard to the part having the film and the part without the film. The perception chromaticity index a* was determined according to the CIE 1976 L*a*b* colorimetric system, and the difference in a* (Δa*) was obtained between the measures of the part to which the film was not adhered (free part, non-close adhesion part) and the part to which the film was adhered.

The detail was as follows.

Spectrophotometer: SPECTROPHOTOMETER CMS-500, manufactured by MURAKAMI COLOR RESEARCH LABORATORY Measurement step: (1) The transmittance spectrum of 390 nm–700 nm is measured every 10 nm. (2) The tristimulus values X, Y, Z are determined based on CIE 1931. (3) The a* is calculated from the following formula using the aforementioned tristimulus values X, Y, Z based on the CIE 1976 L*a*b*calorimetric system:

$$a^* = 500 \times [(X/X_0)^{1/3} - (Y/Y_0)^{1/3}]$$

wherein $X_0 = 98.072$ and $Y_0 = 100$, C light source.

TABLE 1

| | Film | | | | Amount of moisture permeation (g/m² · 72 hr) | Color shading | | Tensile elastic modulus (N/mm²) | Coefficient of bending stress (N · mm) | Coefficient of water absorption (%) |
|---|---|---|---|---|---|---|---|---|---|---|
| | General name | Trademark | Thickness (mm) | Maker | | Δa* | Visual observation | | | |
| Ex. 1 | moisture-proof cellophane | VMT | 0.023 | Futamura Chemical Industries, Co., Ltd. | 1983 | 0.0046 | ○ | 3600 | 0.043 | 50 |
| Ex. 2 | moisture-proof cellophane | G-1 | 0.023 | Futamura Chemical Industries, Co., Ltd. | 1144 | 0.003 | ○ | 3010 | 0.037 | 50 |
| Ex. 3 | moisture-proof cellophane | G-3 | 0.023 | Futamura Chemical Industries, Co., Ltd. | 220 | 0.054 | ○ | 3168 | 0.039 | 50 |
| Ex. 4 | triacetyl cellulose | SH-TAC | 0.05 | FUJI PHOTO FILM CO., LTD. | 1749 | 0.087 | ○ | 3530 | 0.441 | — |
| Ex. 5 | poly(vinyl alcohol) | Vinylon | 0.065 | KURARAY CO., LTD | 392 | 0.032 | ○ | 441 | 0.121 | 75 |
| Ex. 6 | nylon 6 | Rayfan 1401 | 0.03 | Toray Plastic Films Co., Ltd. | 409 | 0.013 | ○ | 549 | 0.015 | 3.5 |
| Ex. 7 | nylon 610 | CM2021 (resin) | 0.025 | prepared with T die | 210 | 0.048 | ○ | 780 | 0.012 | 1.7 |

TABLE 1-continued

| Film | | | | Amount of moisture permeation ($g/m^2 \cdot 72$ hr) | Color shading | | Tensile elastic modulus ($N/mm^2$) | Coefficient of bending stress ($N \cdot mm$) | Coefficient of water absorption (%) |
|---|---|---|---|---|---|---|---|---|---|
| General name | Trademark | Thickness (mm) | Maker | | $\Delta a*$ | Visual observation | | | |
| Ex. 8 polyacrylonitrile | Zexlon | 0.03 | Mitsui Chemicals | 127 | 0.07 | ○ | 2300 | 0.062 | 0.3 |
| Ex. 9 polystyrene | Cellomer S-2 | 0.03 | Okura Industry Co., Ltd. | 300 | 0.094 | ○ | 2100 | 0.057 | 0.05 |
| Com. Ex. 1 polyethylene terephthalate | Lumirror S10 | 0.012 | Toray Industries, Inc. | 102 | 0.176 | ○ | 3923 | 0.007 | 0.4 |
| Com. Ex. 2 polyethylene terephthalate | Lumirror S10 | 0.016 | Toray Industries, Inc. | 87.1 | 0.207 | X | 3923 | 0.016 | 0.4 |
| Com. Ex. 3 polyethylene | Mirason 12* | 0.06 | prepared by inflation technique | 7.4 | 0.797 | X | 490 | 0.106 | <0.1 |

EXAMPLES 10–21

A sample having an adhesive layer formed on one side of a nylon 6 film: Example 10, a sample having an adhesive layer formed on one side of a nylon 6 film and a back coating layer on the other side thereof: Example 11, and a sample having a priming layer (antistatic layer) and an adhesive layer formed on one side of a nylon 6 film and a back coating layer on the other side thereof: Example 12 were prepared. In addition, a sample having an adhesive layer formed on one side of moisture-proof cellophane: Example 13, a sample having an adhesive layer formed on one side of moisture-proof cellophane and a back coating layer on the other side thereof: Example 14, a sample having a priming layer (antistatic layer) and an adhesive layer formed on one side of moisture-proof cellophane and a back coating layer on the other side thereof: Example 15, a sample having an adhesive layer formed on one side of a nylon 610 film: Example 16, a sample having a priming layer (antistatic layer) and an adhesive layer formed on one side of a nylon 610 film and a back coating layer on the other side thereof: Example 17, a sample having an adhesive layer formed on one side of a polyacrylonitrile film: Example 18, a sample having a priming layer (antistatic layer) and an adhesive layer formed on one side of a polyacrylonitrile film and a back coating layer on the other side thereof: Example 19, a sample having an adhesive layer formed on one side of a polystyrene film: Example 20, and a sample having a priming layer (antistatic layer) and an adhesive layer formed on one side of a polystyrene film and a back coating layer on the other side thereof: Example 21 were prepared.

The aforementioned nylon film [Rayfan 1401 (trademark), Toray Plastic Films Co., Ltd.], used in Example 6, was used as the above-mentioned nylon 6 film, the aforementioned moisture-proof cellophane [VMT (trademark), Futamura Chemical Industries, Co., Ltd.], used in Example 1, was used as the moisture-proof cellophane, the aforementioned film obtained by processing nylon 610 resin [CM2021 (trademark), Toray Industries, Inc.] with a T die, used in Example 7, was used as the nylon 610 film, the aforementioned polyacrylonitrile film [ZEXLON (trademark), Mitsui Chemicals], used in Example 8, was used as the polyacrylonitrile film, and the aforementioned polystyrene film [Cellomer S-2 (trademark), Okura Industry Co., Ltd.], used in Example 9, was used as the polystyrene film.

As the adhesive, an acrylic adhesive containing a butyl acrylate (BA)/2-ethylhexyl acrylate (2-EHA)/acrylic acid (AA) copolymer [100 parts by weight, weight average molecular weight (Mw):600,000, copolymerization ratio (BA/2-EHA/AA):87/10/3] obtained by typical solution polymerization and an epoxy type crosslinking agent (3 parts by weight, Tetrad C, Mitsubishi Gas Chemical Company, Inc.) was used. The adhesive was applied to the film with an applicator so that the thickness after drying became 10 μm, and dried at 80° C. for 2 min to form an adhesive layer (amount of adhesive attached to 1 $m^2$ of the film: 5 g).

As the back coating agent, an alkyl carbamate type release agent (Peeloil 1010, Ipposha Co., Ltd.) was used in Examples 11, 12, 14, 15, 17 and 19, which was diluted with toluene to give a solution having a solid content of 0.3%, applied with a wire bar #10 and dried at 80° C. for 1 min to form a back coating layer (amount attached to 1 $m^2$ of the film: 0.7 g). In Example 21, a silicone release agent [a mixture of silicone X62-2416 (trademark), Shin-Etsu Chemical Co., Ltd., a catalyst [CAT-PL-50T (trademark)] and hexane at a ratio of 10 g: 0.4 g: 14 g] was applied with a wire bar #14 and dried at 95° C. for 1 min to form a back coating layer (amount attached to 1 $m^2$ of the film: 0.1 g).

As the primer (antistatic agent), a polymer (Bondeip, Konishi Co., Ltd.) imparted with ion conductivity was prepared into a coating solution, which was applied to a corona surface of the film with a wire bar #10 and dried at 80° C. for 1 min to form a priming layer (amount attached to 1 $m^2$ of the film: 0.5 g). The coating solution had a composition of Bondeip PA100 base resin (solid content ca. 30%) 2 g, Bondeip PA100 curing agent (solid content ca. 30%) 2 g, isopropyl alcohol 8 g and water 4 g.

These samples were each subjected to the test for the resistance to the occurrence of color shading in a polarizing plate surface. The results are shown in the following Table 2.

TABLE 2

| | Laminate film | | | Amount of moisture | Color shading | |
|---|---|---|---|---|---|---|
| | Substrate film | Adhesive layer | Back coating layer | Priming layer | permeation (g/m²·72 hr) | Δa* | Visual evaluation |
| Ex. 10 | nylon 6 | acrylic | — | — | 400 | 0.010 | ○ |
| Ex. 11 | nylon 6 | acrylic | Peeloil | — | 390 | 0.018 | ○ |
| Ex. 12 | nylon 6 | acrylic | Peeloil | Bondeip | 400 | 0.012 | ○ |
| Ex. 13 | moisture-proof cellophane | acrylic | — | — | 1620 | 0.010 | ○ |
| Ex. 14 | moisture-proof cellophane | acrylic | Peeloil | — | 1500 | 0.001 | ○ |
| Ex. 15 | moisture-proof cellophane | acrylic | Peeloil | Bondeip | 1500 | 0.021 | ○ |
| Ex. 16 | nylon 610 | acrylic | — | — | 200 | 0.048 | ○ |
| Ex. 17 | nylon 610 | acrylic | Peeloil | Bondeip | 205 | 0.052 | ○ |
| Ex. 18 | polyacrylo-nitrile (Zexlon) | acrylic | — | — | 125 | 0.060 | ○ |
| Ex. 19 | polyacrylo-nitrile (Zexlon) | acrylic | Peeloil | Bondeip | 130 | 0.062 | ○ |
| Ex. 20 | polystyrene | acrylic | — | — | 300 | 0.098 | ○ |
| Ex. 21 | polystyrene | acrylic | silicone | Bondeip | 290 | 0.114 | ○ |

From Tables 1 and 2, it is clear that the use of the films (Examples 1–21), which showed the amount of moisture permeation of not less than 100 g/m²·72 hr at 35° C., 80% RH, led to no occurrence of color shading on the polarizing plate surface, with the Δa then of not more than 0.2. These protection films of Examples 1–21 were used for assembling liquid crystal displays comprising the display surface of a liquid crystal module covered with the film. The film could cover the display surface of a liquid crystal module with extremely superior workability, which allowed efficient assembling of the liquid crystal displays.

As is evident from the foregoing explanation, when the protection film of the present invention is used for assembling liquid crystal displays, the protection film can be applied to the display surface of a liquid crystal module with superior workability during the assembling. The film prevents occurrence of changes in optical hue (color shading) on the display surface in the state of actual use upon peeling off of the protection film after distribution process.

This application is based on patent application Nos. 328545/1999 and 268693/2000 filed in Japan, the contents of which are hereby incorporated by reference.

What is claimed is:

1. A film for protecting a display surface of a liquid crystal display, which comprises a polymer film having a coefficient of bending stress k as expressed by the formula: $k=Eh^3$, wherein E is a tensile elastic modulus (N/mm2) in a machine direction and h is a thickness (mm), of not less than 0.01 (N·mm), and which shows an amount of moisture permeation at 35° C., 80% RH (relative humidity) for 72 hours of not less than 100 g/m²·72 hr.

2. The film of claim 1, wherein the polymer film comprises an antistatic agent for an antistatic treatment.

3. The film of claim 1, wherein the polymer film is selected from the group consisting of a cellulose film, a poly(vinyl alcohol) film, a nylon film, a polystyrene film and a poly(meth)acrylonitrile film.

4. The film of claim 1, wherein the polymer film has a thickness of not less than 15 μm.

5. The film of claim 1, which makes a difference (Δa*) in a perception chromaticity index a*, as measured by a CIE1976 L*a*b* colorimetric system, between a partial display surface covered with the film and an uncovered part of the display surface, not more than 0.2, wherein the difference is obtained by covering a part of the display surface of a polarizing plate with the protection film, standing the polarizing plate at 35° C., 80% RH for 72 hours, and determining the indices of the covered part and the uncovered part.

6. A liquid crystal display comprising a display surface protected with the protection film of claim 1.

7. A method for protecting a surface of a liquid crystal display, which comprises covering the surface with the protection film of claim 1.

8. A film for protecting a display surface of a liquid crystal display, which comprises a laminate film comprising a polymer film having a coefficient of bending stress k as expressed by the formula: $k=Eh^3$, wherein E is a tensile elastic modulus (N/mm²) in a machine direction and h is a thickness (mm), of not less than 0.01 (N·mm), and an adhesive layer formed on one side of the polymer film, or a laminate film comprising said polymer film, an adhesive layer formed on one side of the polymer film and a back coating layer formed on the other side of the polymer film, and which shows an amount of moisture permeation at 35° C., 80% RH for 72 hours of not less than 100 g/m²·72 hr.

9. The film of claim 8, wherein the laminate film comprises an antistatic agent in the adhesive layer, the polymer film, or the adhesive layer and the polymer film, or comprises an antistatic layer formed under the adhesive layer, the back coating layer, or the adhesive layer and the back coating layer, for an antistatic treatment.

10. The film of claim 8, wherein the polymer film is selected from the group consisting of a cellulose film, a poly(vinyl alcohol) film, a nylon film, a polystyrene film and a poly(meth)acrylonitrile film.

11. The film of claim 8, wherein the polymer film has a thickness of not less than 15 μm.

12. The film of claim 8, which makes a difference (Δa*) in a perception chromaticity index a*, as measured by a CIE1976 L*a*b* colorimetric system, between a partial display surface covered with the film and an uncovered part of the display surface, not more than 0.2, wherein the difference is obtained by covering a part of the display surface of a polarizing plate with the protection film, standing the polarizing plate at 35° C., 80% RH for 72 hours, and determining the indices of the covered part and the uncovered part.

13. A liquid crystal display comprising a display surface protected with the protection film of claim 8.

14. A method for protecting a surface of a liquid crystal display, which comprises covering the surface with the protection film of claim 8.

15. A film for protecting a display surface of a liquid crystal display, which comprises a polymer film having a coefficient of bending stress k as expressed by the formula: $k=Eh^3$, wherein E is a tensile elastic modulus ($N/mm^2$) in a machine direction and h is a thickness (mm), of not less than 0.01 (N·mm), and which shows an amount of moisture permeation at 35° C., 80% RH for 72 hours of not less than 100 g/m²·72 hr and not more than 7000 g/m²·72 hr.

16. A film for protecting a display surface of a liquid crystal display, which comprises a laminate film comprising a polymer film having a coefficient of bending stress k as expressed by the formula: $k=Eh^3$, wherein E is a tensile elastic modulus ($N/mm^2$) in a machine direction and h is a thickness (mm), of not less than 0.01 (N·mm) and an adhesive layer formed on one side of the polymer film, or a laminate film comprising said polymer film, an adhesive layer formed on one side of the polymer film and a back coating layer formed on the other side of the polymer film, and which shows an amount of moisture permeation at 35° C., 80% RH for 72 hours of not less than 100 g/m²·72 hr and not more than 7000 g/m²·72 hr.

* * * * *

UNITED STATES PATENT AND TRADEMARK OFFICE
CERTIFICATE OF CORRECTION

PATENT NO.  : 6,407,788 B1
DATED       : June 18, 2002
INVENTOR(S) : Okumura et al.

It is certified that error appears in the above-identified patent and that said Letters Patent is hereby corrected as shown below:

Title page,
Item [56], OTHER PUBLICATIONS, "Abstracts only of Japan (JP 2000-212298) (Feb. 8, 2000)." should read as -- Abstracts of Japan (JP 2000-212298) (Feb. 8, 2000) Abstract only. --

Column 13,
Line 51, "(N/mm2)" should read -- $(N/mm^2)$ --.

Signed and Sealed this

Fourteenth Day of January, 2003

JAMES E. ROGAN
*Director of the United States Patent and Trademark Office*